United States Patent [19]
Sukegawa

[11] Patent Number: 5,860,083
[45] Date of Patent: Jan. 12, 1999

[54] DATA STORAGE SYSTEM HAVING FLASH MEMORY AND DISK DRIVE

[75] Inventor: Hiroshi Sukegawa, Tokyo, Japan

[73] Assignee: Kabushiki Kaisha Toshiba, Kawasaki, Japan

[21] Appl. No.: 818,983

[22] Filed: Mar. 14, 1997

[30] Foreign Application Priority Data

Nov. 26, 1996 [JP] Japan ................................. 8-314850

[51] Int. Cl.⁶ .................................................. G06F 12/08
[52] U.S. Cl. ........................... 711/103; 711/117; 711/171; 711/173
[58] Field of Search .................................. 711/103, 113, 711/117, 170, 171, 173

[56] References Cited

U.S. PATENT DOCUMENTS

| | | | |
|---|---|---|---|
| 5,175,842 | 12/1992 | Totani | 711/161 |
| 5,371,876 | 12/1994 | Ewertz et al. | 711/159 |
| 5,437,018 | 7/1995 | Kobayashi et al. | 395/652 |
| 5,535,357 | 7/1996 | Moran et al. | 711/103 |
| 5,644,539 | 7/1997 | Yamagami et al. | 365/200 |
| 5,701,492 | 12/1997 | Wadsworth et al. | 395/712 |
| 5,745,418 | 4/1998 | Ma et al. | 365/185.33 |
| 5,778,418 | 7/1998 | Auclair et al. | 711/101 |

FOREIGN PATENT DOCUMENTS

| | | |
|---|---|---|
| 0 706 135 | 4/1996 | European Pat. Off. . |
| 5-11933 | 1/1993 | Japan . |
| 8-63395 | 3/1996 | Japan . |
| 8-115241 | 5/1996 | Japan . |

*Primary Examiner*—Tod R. Swann
*Assistant Examiner*—Conley B. King, Jr.
*Attorney, Agent, or Firm*—Finnegan, Henderson, Farabow, Garrett & Dunner, L.L.P.

[57] ABSTRACT

In a data storage system using a flash memory unit and an HDD, the storage area of the flash memory unit is logically divided into a permanent storage area, a non-volatile cache area, which are used as cache memory areas of the HDD, and a high-speed access area. These divided areas are individually managed. The permanent storage area stores data which is used frequently for a relatively long time period. The non-volatile cache area is used as an ordinary cache memory area in which data, which is updated relatively frequently, is stored. The high-speed access area is a storage area to be used by, e.g. an operating system (OS) of a host system. For example, a swap file, which needs to be accessed at high speed, is shifted into the high-speed access area.

28 Claims, 10 Drawing Sheets

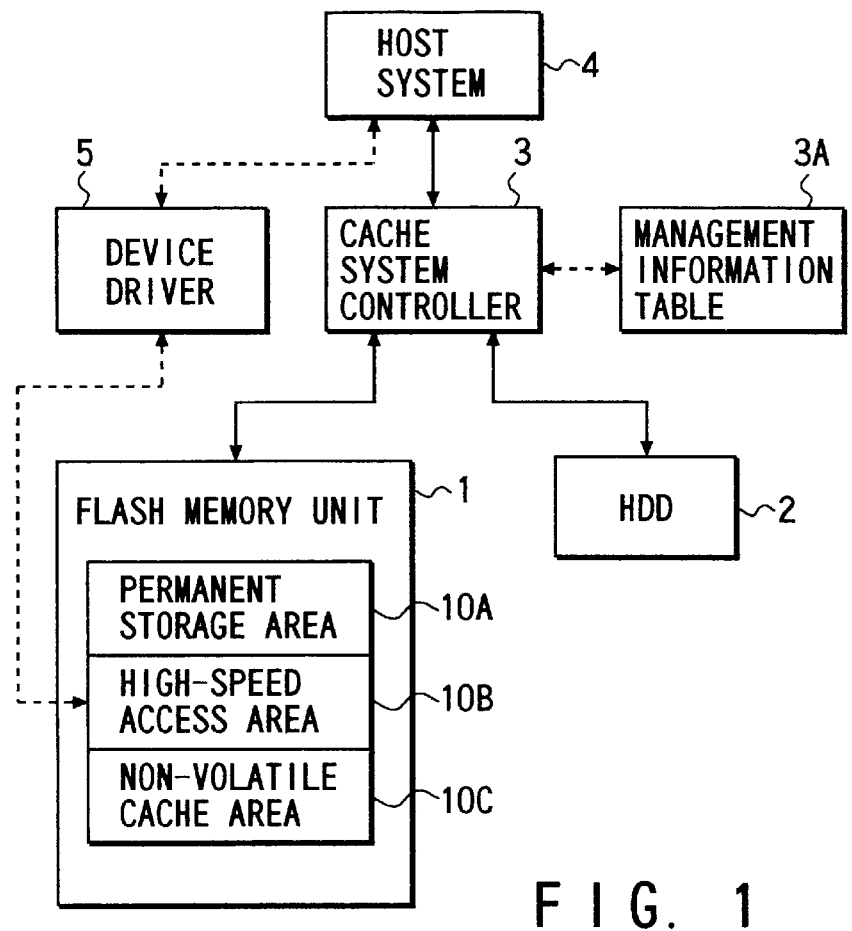
F I G. 1
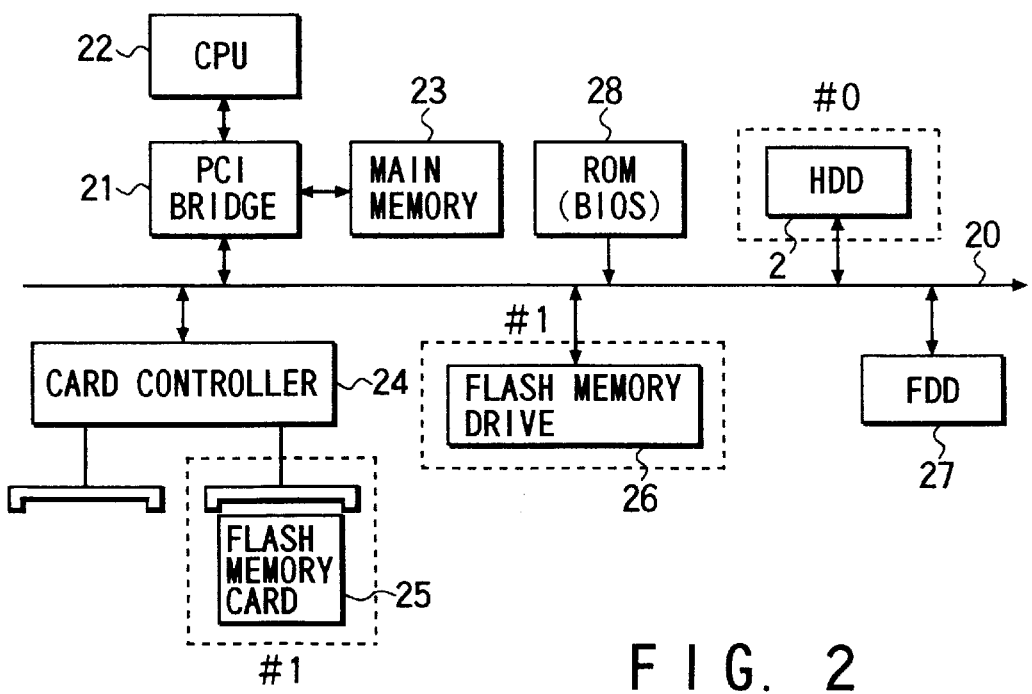
F I G. 2

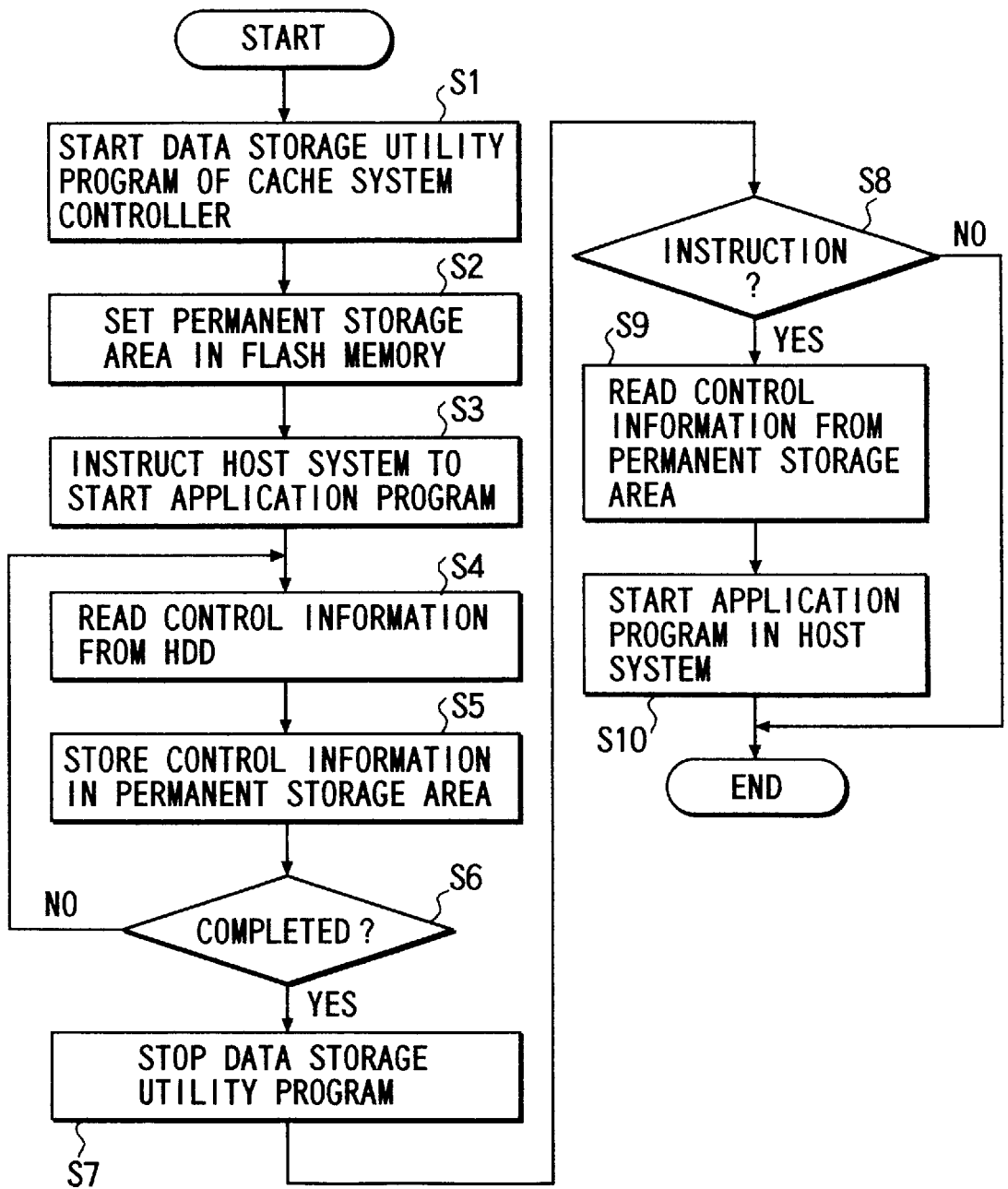
F I G. 3

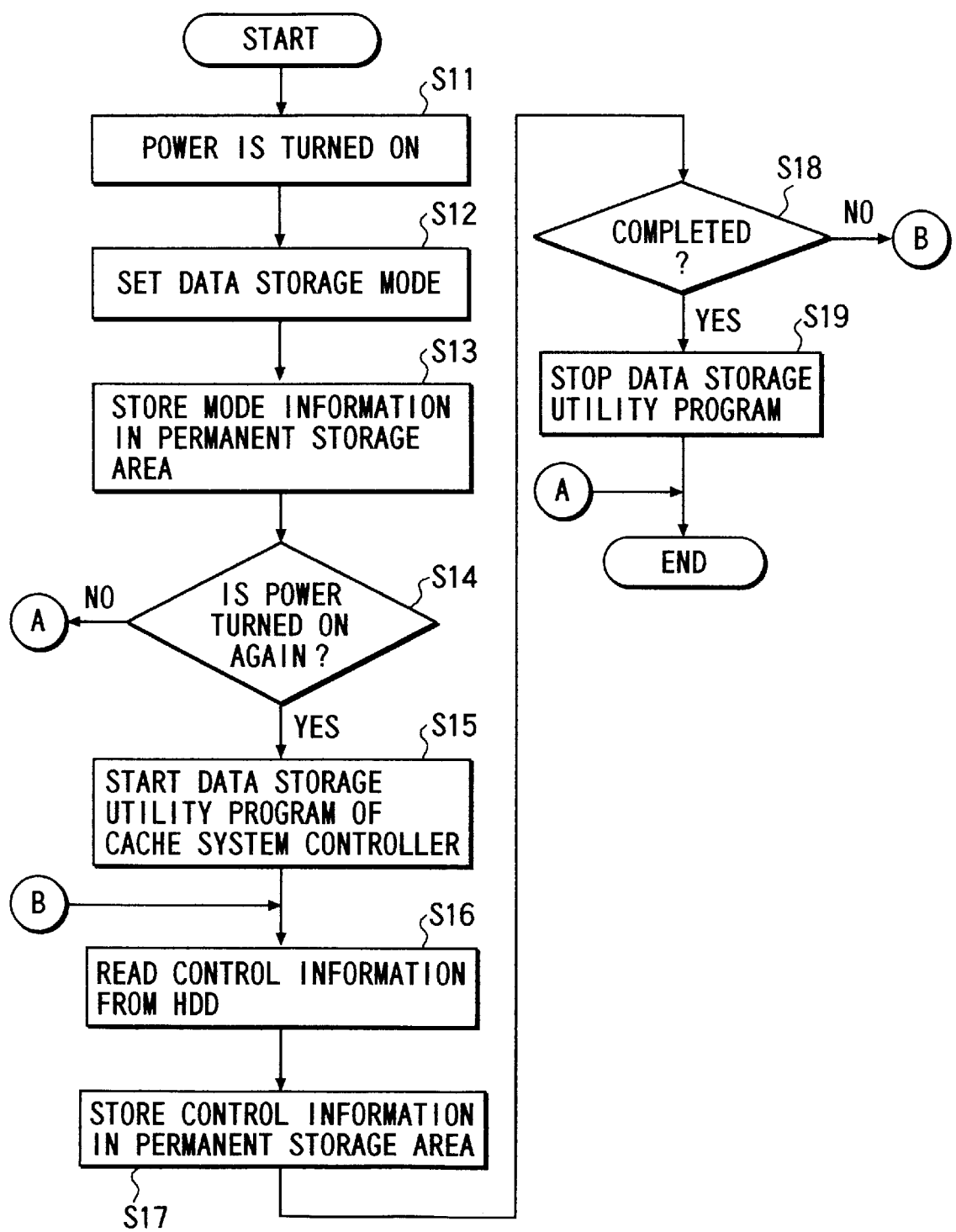
F I G. 4

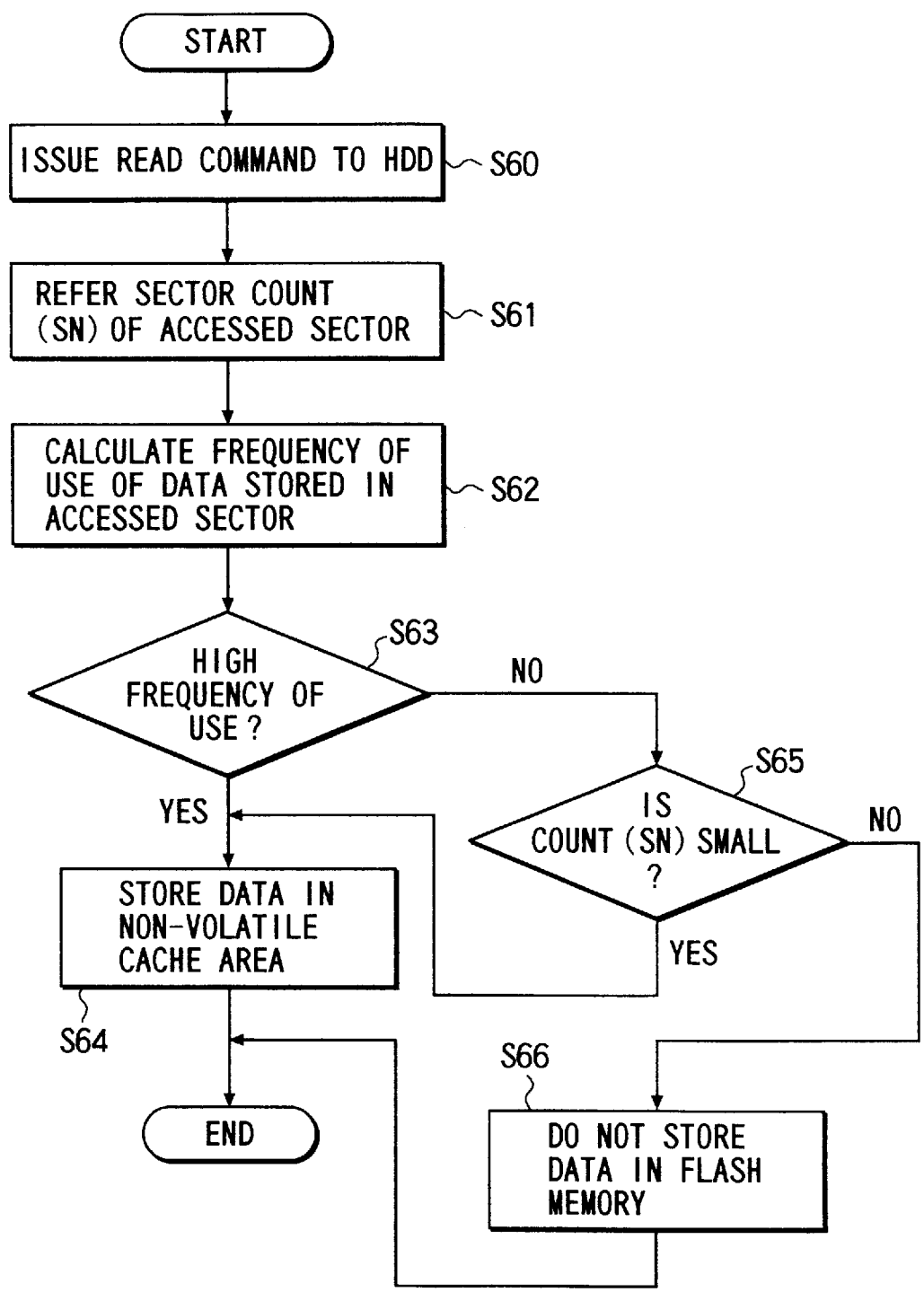
F I G. 8A

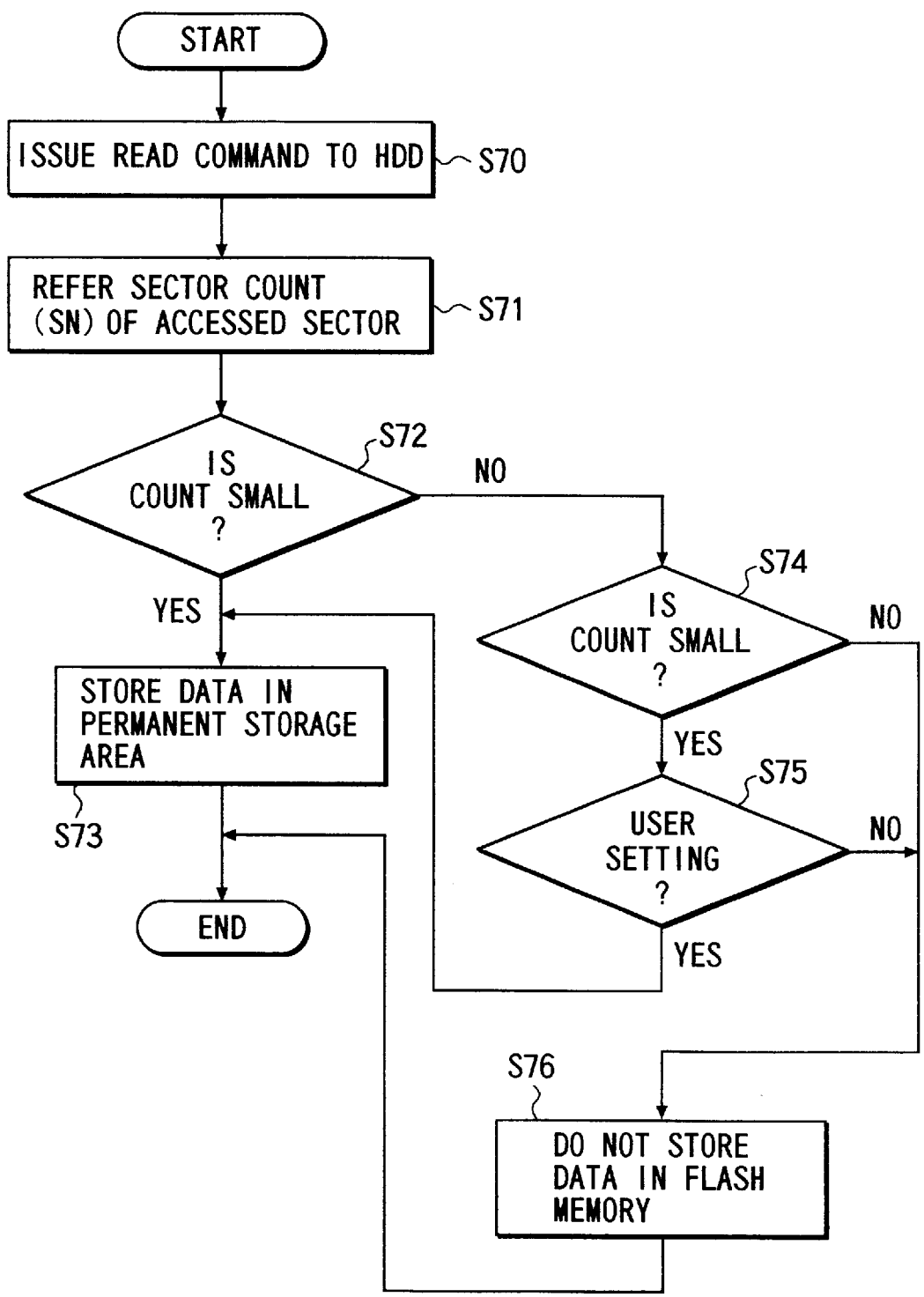
F I G. 8 B

DATA STORAGE SYSTEM HAVING FLASH MEMORY AND DISK DRIVE

BACKGROUND OF THE INVENTION

The present invention relates to a data storage system which is applied to a computer system and has a flash memory unit (also known as "semiconductor disk unit") and a disk drive.

In a conventional computer system, a hard disk drive (HDD) is used as an external memory device wherein a disk is used as a storage medium. The HDD can be used as a large-capacity file apparatus. However, as compared to a main memory comprising a semiconductor memory (e.g. a DRAM), the access speed of the HDD is lower. A cache system for the HDD has been known as means for increasing the access speed of the HDD.

In the cache system, in particular, frequently used data is-stored in a storage medium having a higher access speed than the HDD, thereby compensating the low access speed of the HDD. In a specific system, a part of the storage area of the main memory (volatile IC memory) comprising a DRAM is used as a cache area of the HDD (this system being called "smartdrive"). In this system, however, the main memory is cleared when the power to the system is switched off. Thus, the cache system does not function when the power is switched on. Accordingly, after the power is switched on, the HDD is accessed to enable the cache system to function effectively, thereby achieving a learning effect. The learning effect will now be described. When a request for access to the HDD occurs, this request first fails since no data is stored in the cache memory (a part of the main memory in this case). Then, the data associated with the access request is read out from the HDD and stored in the cache memory. Thus, if the next access request occurs, the data stored in the cache memory is quickly read out from the cache memory in place of the cache memory. This effect of achieving the cache function is called "leaning effect."

The cache system using the above-described main memory does not effectively function when the first access request for the HDD occurs at the time of turning-on of power. Consequently, when the computer system is started up, the cache system cannot be utilized to run the operating system (OS) or frequently used application programs (AP). The OA and AP are thus started up by using the low access-speed HDD. With an increase in the scale of the OS and AP, the low access speed of the HDD elongates the time needed to start up the OS and AP. This is considered a serious problem.

To solve this problem, there has been proposed a cache system for an HDD, which uses a flash memory unit comprising a flash EEPROM (electrically erasable programmable read-only memory). The flash memory, unlike the main memory, is a non-volatile storage medium and has a higher access speed than the HDD. Accordingly, in the cache system using the flash memory, the data stored in the flash memory functioning as cache memory can be retained even if the power is switched off, and the cache function is effectively performed at the time of turning on power. Moreover, the flash memory having a higher access speed than the HDD can perform a high-speed buffer function.

As described above, the cache system using the cache memory as flash memory can effectively perform the cache function for the HDD even when the power is turned on. Therefore, the cache system as combined with the HDD can constitute a high-speed, large-capacity external storage system.

In other words, the data storage system comprising the combination of the large-capacity HDD and high-speed, non-volatile flash memory can achieve not only the above-described function but also a function which will influence the performance of the computer system by the effective use of the respective memory units. Specifically, the storage area of the flash. memory is set in accordance with the contents of data to be stored, or the cooperative function of the flash memory and the HDD is set, thereby to effectively use the data storage system, as will be described below.

For example, when information (or control information in the present invention) necessary for starting up the OS or a frequently used AP is to be stored in the storage area in the flash memory, it is desirable that the OS and AP are permanently stored in the flash memory since the frequency of use of both programs is high. On the other hand, for example, when a word search utility program is run for a number of files and the HDD is accessed, it is not important, in general, to permanently store the file accessed from the HDD in the cache memory area of the flash memory. Since such an accessed file is frequently updated, there is no need to permanently store it.

Besides, when the computer system performs a swapping operation, it is possible to store a swap file in the flash memory in place of the HDD. Since the file size of the swap file produced in the swapping operation is variable, the size of the storage area set in the flash memory needs to be variable accordingly. However, since the storage area of the flash memory is limited, it is desirable to perform a cooperative function with the HDD, for example, to use the storage area in the HDD in accordance with the increase in file size of the swap file.

BRIEF SUMMARY OF THE INVENTION

The object of the present invention is to provide a data storage system having a disk drive and a flash memory unit, wherein the storage area of the flash memory unit as well as a cache system is efficiently used, and cooperative functions of the flash memory and an HDD are achieved, whereby the data storage system can be efficiently used.

A data storage system according to the present invention comprises a disk drive, flash memory means, and control means. The flash memory means uses a non-volatile flash memory as a data storage medium, and has an entire storage area logically sorted into a plurality of storage areas assigned to predetermined functions. The control means controls data input/output of the disk drive and the flash memory means and stores all data or specified data stored in the disk of the disk drive into that one of the logically sorted storage areas in the flash memory means, which has the associated function.

The flash memory means has the entire storage area logically sorted into a first storage area for permanently storing data, a second storage area which can be associated with the host system and is used for high-speed access, and a third storage area for use as a non-volatile cache memory area. When the control means accesses the flash memory means according to an instruction from the host system, the control means individually manages the first storage area, second storage area and third storage area. The data stored in the disk drive is read out and stored in the first and third storage areas, and the data transferred from the host system is stored in the second storage area.

According to this system, for example, control information necessary for starting an application program (AP) and an OS, which are frequently used, is stored in the first storage area. Thus, the storage area of the flash memory can be effectively used in accordance with the function and the condition of use of data.

The control means includes means for determining whether or not the second storage area has an area size for storing the specified data transferred from the host system.

When the area size in the second storage area is determined to be insufficient by the determining means at the time of storing the specified data in accordance with an instruction from the host computer, the second storage area is expanded to a storage area in the disk of the disk drive and the specified data is stored dividedly into the second storage area and the expanded area in the disk.

Accordingly, when a swap file, for example, is stored in the second storage area, the second storage area can be expanded in accordance with the file size of the swap file. For example, an empty area in the disk drive may be used as the expanded area, and a part of the swap file, which cannot be stored in the second storage area, is stored in the expanded area. The information such as the swap file having a variable size can be stored, with the cache memory area in the flash memory being freely varied. In this case, the flash memory and the HDD may be made to function cooperatively, so as to take advantage of the high-speed access performance of the flash memory and the file area with large capacity of the disk drive.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing a main part of a data storage system according to the present invention;

FIG. 2 is a block diagram showing a main part of a computer system according to the present invention;

FIG. 3 is a flow chart illustrating an operation relating to a first embodiment of the invention;

FIG. 4 is a flow chart illustrating an operation relating to a modification of the first embodiment of the invention;

FIGS. 8A and 8B are flow charts illustrating an operation relating to a modification of the third embodiment of the invention.

DETAILED DESCRIPTION OF THE INVENTION

Figure 5:
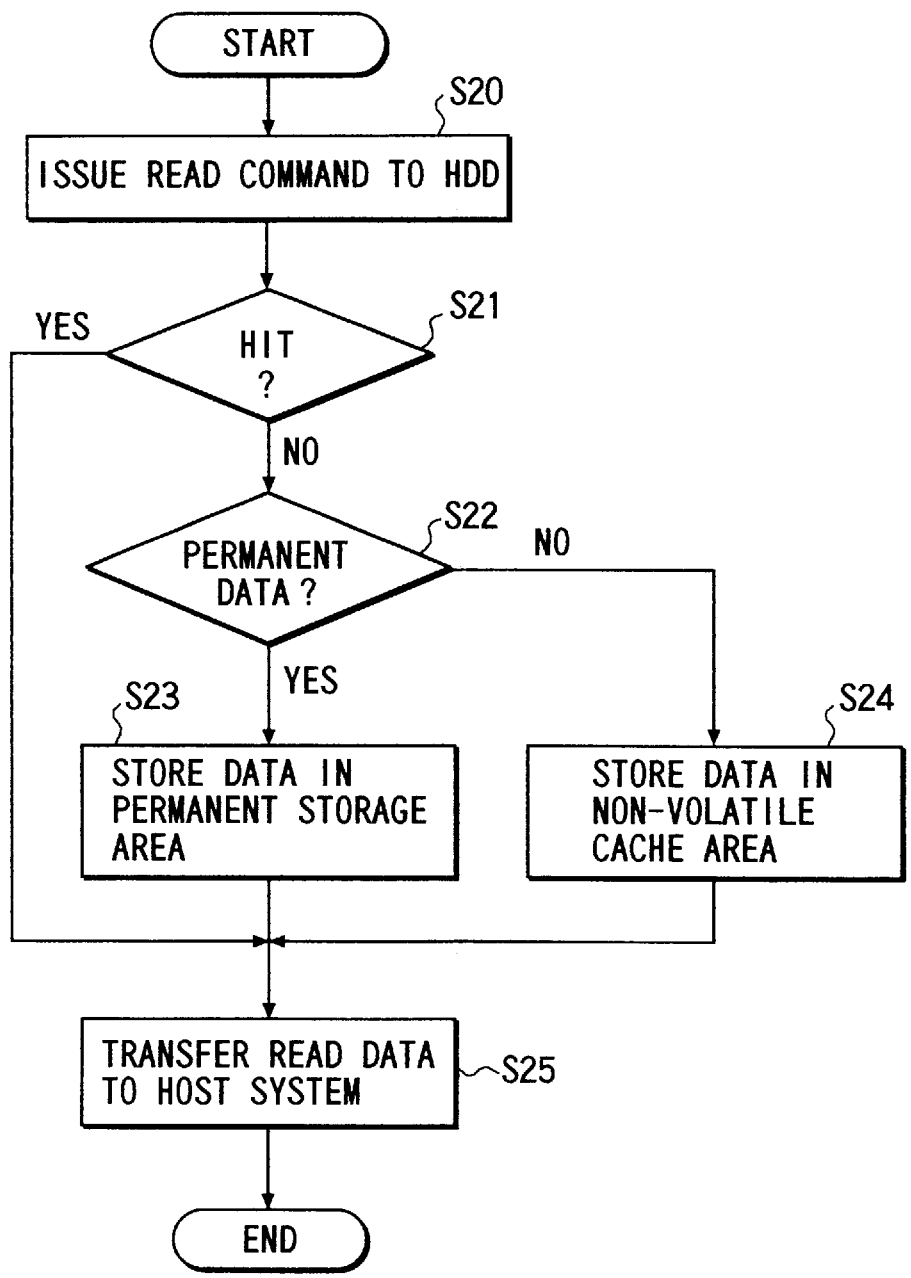
FIG. 5 is a flow chart illustrating an operation relating to a second embodiment of the invention.

Embodiments of the present invention will now be described with reference to the accompanying drawings.

(Data Storage System)

It is assumed that the data storage system of the present invention is applied to a computer system such as a personal computer. Thus, as shown in FIG. 1, this data storage system has a flash memory unit 1 constituted by a flash EEPROM, a disk drive or an HDD (Hard Disk Drive) 2, and a controller. The controller includes a cache system controller 3 (hereinafter called "controller") for performing a cache function of using the flash memory unit 1 as a cache memory, and a device driver (software) 5 with no cache function.

The device driver 5 has a function of controlling the flash memory unit 1 under the management of the OS (Operation System) of a host system 4. In this invention, in particular, the device driver 5 performs the access control (to be described later) of a highspeed access area 10B or a specific storage area in the flash memory unit 1. The controller 3 performs data input/output control (including cache operation control) for the flash memory unit 1 and HDD 2 via respective device drivers (i.e. a flash memory driver and a hard disk driver).

The host system 4 refers to a computer body comprising a CPU of the computer system, a main memory storing the OS and an application program (AP), and other various structural elements. The controller 3 is provided between the host system 4 and the storage units 1 and 2. The controller 3 controls the flash memory unit 1 and HDD 2, as an integrated storage system, in accordance with access requests (read/write commands) issued from the host system 4 to the HDD.

(Computer System)

The data storage system and host system 4 of the present invention are components of a computer system such as a personal computer, as shown in FIG. 2. In this computer system, the flash memory unit, HDD 2 and a floppy disk drive (FDD) 27 according to the present invention can be used as peripheral devices.

Specifically, a PCI bus 20 is used as a local bus connected to the peripheral devices. The PCI bus 20 is connected to a CPU 22 via a PCI bridge 21. The PCI bridge 21 is connected to a main memory 23 storing the OS and AP of the host system 4. The PCI bus 20 is also connected to a PC card controller 24 matching with a card bus, a flash memory drive (according to ATA specifications) 26, the FDD 27, the HDD 2 and a ROM (Read-Only Memory) 28 storing a basic input/output system (BIOS).

The PC card controller 24 is a controller for controlling an IC card of PCMCIA standards. The flash memory unit 1 includes a flash memory card 25 controlled by the PC card controller 24, and the flash memory drive 26. The FDD 27 enables the OS, AP or various drivers such as device drivers relating to the present invention to be installed in the system by means of a floppy disk.

In the computer system, different drive numbers (#0, #1) are assigned to the HDD 2 and the flash memory drive 26 or flash memory card 25. The HDD 2 and flash memory unit 1 are treated as different drives in hardware by the OS or AP of the host system 4. Accordingly, the OS or AP can use, via the controller 3 or device driver 5, those storage areas in the flash drive 26 or flash memory card 25 of flash memory unit 1, which are other than the storage area used as the cache memory area relating to the present invention, as storage areas of an ordinary external storage device.

(First Embodiment)

An operation of the above-described system configuration according to a first embodiment of the invention will now be described with reference to a flow chart of FIG. 3.

In the present invention, it is assumed that the entire storage area of the flash memory unit 1 is logically divided into permanent storage area 10A, high-speed access area 10B and non-volatile cache area 10C and the divided areas are managed. The controller 3 manages the storage areas 10A to 10C of the flash memory unit 1 by using a management information table 3A. The management information table 3A is stored, for example, in the non-volatile cache area 10C of flash memory unit 1.

The first embodiment relates to a system wherein the permanent storage area 10A of flash memory unit 1 is used as a cache memory area. In this embodiment, it is supposed that the user desires to start a frequently used application program (AP) at high speed at all times.

The user starts a data storage utility program of the cache system controller 3 via a user interface provided in the host system 4 (step S1). The data storage utility program reads specified data from the HDD 2 and stores the read data in a specified storage area in the flash memory unit 1. In this case, it is assumed that the user sets the permanent storage area 10A in the flash memory unit 1 as the data storage area, at the time of instructing the start of the data storage utility program (step S2).

Then, the user instructs the host system 4 to start the AP (step S3). The host system 4, upon receiving the AP start instruction, issues a read command to the controller 3 in order to read control information necessary for the start of the AP from the HDD 2.

The controller 3 controls the HDD 2, reads out the control information necessary for the start of the AP and transfers the read-out control information to the host system 4 (step S4). At this time, according to the started-up data storage utility program, the controller 3 stores the AP control information read out from the HDD 2 in the permanent storage area 10A of flash memory unit 1 (step S5). When the AP has been prepared to start, the data storage utility program is stopped by the instruction from the user ("YES" in step S6; step S7). Through these operations, the control information necessary for starting the AP is stored in the permanent storage area 10A in the flash memory unit 1.

In this case, the control information is stored in the permanent storage area 10A in flash memory unit 1 under the file name designated by the user. Information for correlating the file name and the AP and information of other comment is recorded on the management information table 3A by the data storage utility program. The user inputs the file name to the controller 3 via the user interface, thereby referring to the file (the control information of the AP in this case) stored in the permanent storage area 10A. The user can delete the file, if unnecessary. In other words, the control information necessary for starting the AP is permanently stored in the permanent storage area 10A in the flash memory unit 1 as one file, until the user instructs the deletion of the file.

If the user instructs the start of the same AP via the user interface, the host system 4 issues the read command, as described above, to read from the HDD 2 the control information necessary for starting the AP ("YES" in step S8). Upon receiving the read command, the controller 3 determines whether the control information to be accessed is stored in the flash memory unit 1 by using the management information table 3A. Since the AP control information is stored in the permanent storage area 10A, the cache memory area is successfully accessed. Accordingly, the controller 3 reads out the AP control information from the permanent storage area 10A of flash memory unit 1, without accessing the HDD 2, and transfers the read-out control information to the host system 4 (step S9). The host system 4 starts the AP designated by the user on the basis of the transferred AP control information (step S10).

By the above-described cache system, the control information of the frequently used AP designated by the user is read out from the HDD 2 and stored in the permanent storage area 10A in the flash memory unit 1 used as the cache memory area. Accordingly, when the AP is to be started next time, the AP control information can be read out quickly from the permanent storage area 10A used as cache memory area, and not from the HDD 2. Thereby, the host system 4 can quickly acquire the control information at the time of starting the AP. As a result, the AP can be quickly started. Since the AP control information is permanently stored in the permanent storage area 10A until the user instructs the deletion of the control information, as described above, the frequently used AP can be started quickly at all times.

(First Modification of the First Embodiment)

FIG. 4 is a flow chart illustrating a first modification of the first embodiment. This modification relates to a system having a mode (data storage mode) for storing the control information necessary for starting the OS in the permanent storage area 10A of flash memory unit 1, for example, when the OS of the host system 4 is started in a series of operations from the turn-on of power to the completion of the starting operation.

When the system is switched on and the user sets the data storage mode via the user interface, the controller 3 stores the information representing the data storage mode in the permanent storage area 10A in flash memory unit 1 (steps S11 to S13).

After the power is turned off and then turned on again, the controller 3 starts the above-mentioned data storage utility program on the basis of the information of the set data storage mode ("YES" in step S14; step S15). According to the data storage utility program, the control information, which is pre-stored in the HDD 2 and necessary for starting the OS, is read out and stored in the permanent storage area 10A (steps S16 and S17). The controller 3 transfers to the host system 4 the control information necessary for starting the OS read out from the HDD 2. Based on the control information, the host system 4 starts the OS. After the preparation for starting the OS is completed, the data storage utility program is stopped ("YES" in step S18; step S19).

According to this system, when the OS is automatically started by the control information read out from the HDD 2 at the time of turning-on of power, the control information is stored in the permanent storage area 10A used as the cache memory area for the HDD 2. Accordingly, when the OS is started at the time of the next turning-on of power, the control information necessary for starting the OS is read out not from the HDD 2 but from the permanent storage area 10A or cache memory area, and the read-out control information is transferred to the host system 4. Thus, the control information can be accessed from the permanent storage area 10A in the flash memory unit 1 having a higher access speed than the HDD 2. As a result, the OS can be started at higher speed.

Like the AP control information, the OS control information may be stored as one file in the permanent storage area 10A. Thereby, the user can refer to, or delete, the OS control information on an as-needed basis. For example, at the time of shipment of the personal computer, if the OS is pre-installed in the flash memory unit 1 functioning as cache memory area, the user can delete the OS control information based on the user's judgment. Specifically, the OS control information may be deleted by a user who is used to starting the OS by making use of a resume function of BIOS28, without re-starting the personal computer.

(Second Modification of the First Embodiment)

In a second modification of the first embodiment, the BIOS stored in the ROM 28 of the system, as shown in FIG. 2, includes a part of the operation program of the controller 3. According to this system, when the power is turned on, the BIOS can start the OS of the system or the AP by accessing the flash memory unit 1 without activating the HDD 2. Therefore, the power for starting the HDD 2 can be saved. This modification is suitable for a power-save mode computer. The BIOS having the resume function of the system can restart the OS of the system or the AP from the state before the power turn-off by accessing the flash memory unit 1, without starting the HDD 2, at the time of the resume.

(Second Embodiment)

A second embodiment of the invention relates to a system wherein the high-speed access area 10B which is logically set in the storage areas in flash memory unit 1, as shown in FIG. 1, is used. The high-speed access area 10B is supposed to be a storage area which can be directly accessed via the controller 3 or device driver 5 with no cache function from the OS or AP in the host system 4.

In other words, the high-speed access area 10B is not necessarily used as a cache memory area of the HDD 2. The high-speed access area 10B is used in a way different from the above-mentioned permanent storage area 10A or the non-volatile cache area 10C (to be described later). In the system of the present invention, when the host system 4 issues the read command to the HDD 2, the controller 3 determines whether the data to be accessed (e.g. AP control information as mentioned above) is stored in the permanent storage area 10A or non-volatile cache area 10C, which is the cache memory area (or whether the cache memory area is "hit") (steps S20 and S21), as shown in FIGS. 5. If the data to be accessed is "hit", the controller 3 reads the data from the permanent storage area 10A or non-volatile cache area 10C and transfers the read-out data to the host system 4 ("YES" in step S21; step S25).

On the other hand, if the cache memory area is not "hit", the controller 3 accesses the HDD 2, reads out the data to be accessed and transfers the read-out data to the host system 4. In this case, as described above, if the data to be accessed is the permanent data designated by the user, the controller 3 stores it in the permanent storage area 10A ("NO" in step S21; steps S22 and 23). If the data to be accessed is not the permanent data designated by the user, the controller 3 stores the data in the non-volatile cache area 10C which is used as an ordinary cache memory area ("NO" in step S22; step S24). Thus, the data read out from the HDD 2 is stored at least once in the permanent storage area 10A and non-volatile cache area 10C in flash memory unit 1. In particular, it is assumed that the non-volatile cache area 10C is used independently by the controller 3 and not directly used by the user's intent.

Figure 6A:
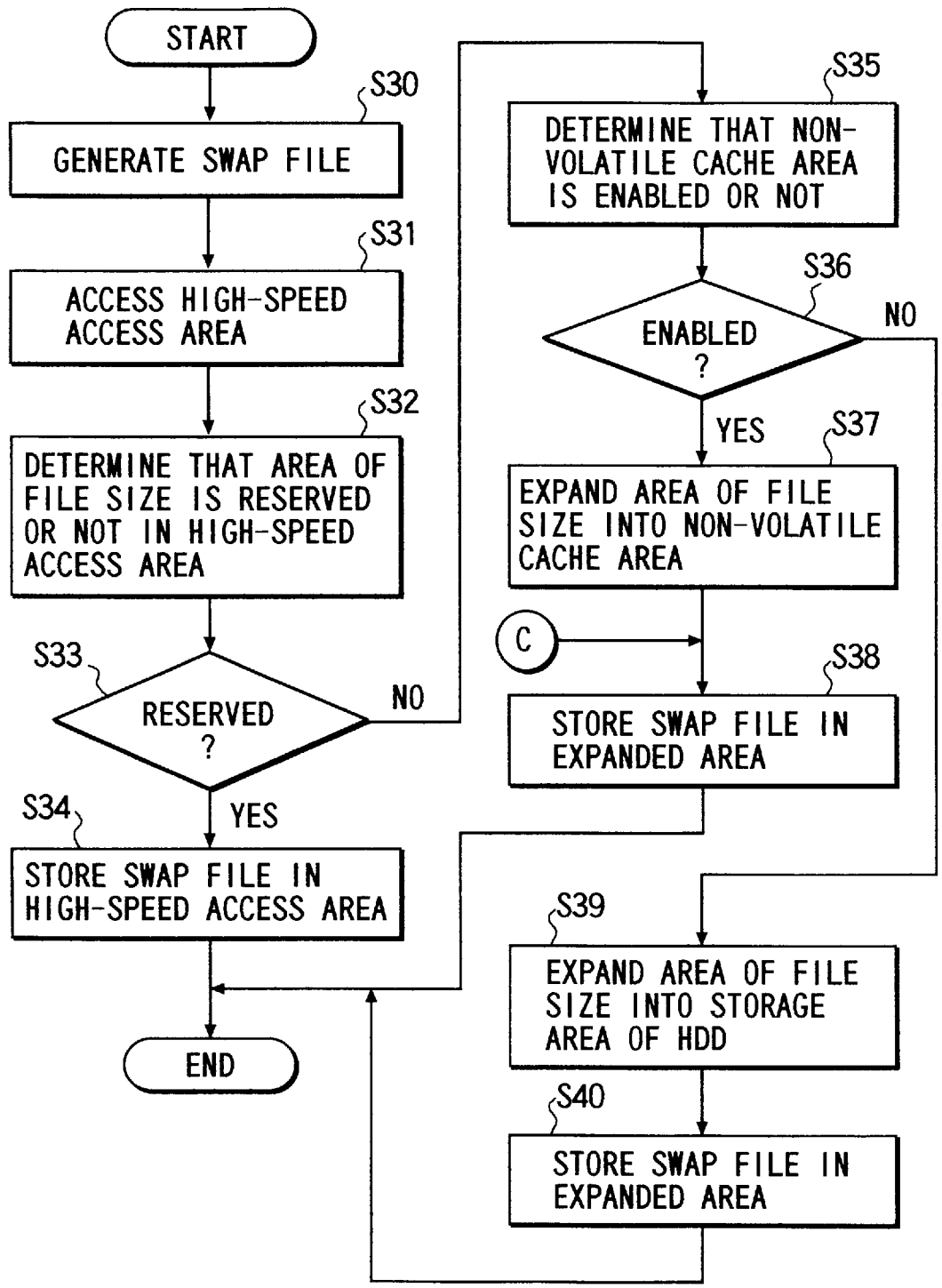
FIGS. 6A and 6B are flow charts illustrating the operation relating to the second embodiment of the invention.

As compared to the permanent storage area 10A and non-volatile cache area 10C, the high-speed access area 10B relating to the present embodiment permits direct access by the OS or AP. Thus, the high-speed access area 10B can store not only the data read out of the HDD 2 but also data to be newly written. A specific example of the present embodiment will now be described with reference to flow charts of FIGS. 6A and 6B. In this example, it is assumed that a swap file in a swapping operation is stored in the high-speed access area 10B.

When the host system 4 executes a program other than the programs such as the AP stored in the main memory 23, the host system 4 performs a swapping operation. In the swapping operation, the program (including data) stored in the main memory 23 is shifted from the main memory 23 as a swap file, thereby to load the program to be executed in the main memory 23. Normally, the swap file is shifted to the HDD 2.

In the present embodiment, if the swap file is produced by the swapping operation of the host system 4, the controller 3 responds to an access request from the host system 4 and accesses the high-speed access area 10B in the flash memory unit 1 (steps S30 and S31). At this time, the controller 3 determines whether or not the high-speed access area 10B corresponding to the file size of the swap file is reserved (step S32). If the high-speed access area 10B is reserved, the controller 3 stores the swap file in the high-speed access area 10B ("YES" in step S33; step S34). The OS can refer to the swap file stored in the high-speed access area 10B on the basis of the file name. Accordingly, the OS can read out the swap file from the high-speed access area 10B on an as-needed basis via the controller 3, and restore the swap file to the main memory 23.

On the other hand, if the file size of the swap file is relatively large and the swap file cannot be stored in the reserved high-speed access area 10B, the controller 3 performs a process for expanding the storage area including the high-speed access area 10B in the following manner. Specifically, the controller 3 determines whether or not the non-volatile cache area 10C can be used (step S35). If it can be used, the controller 3 expands the swap file storage area to the non-volatile cache area 10C ("YES" in step S36; step S37). Accordingly, the controller 3 stores the swap file shifted from the host system 4 into the expanded area comprising the high-speed access area 10B and non-volatile cache area 10C (step S38).

If the non-volatile cache area 10C is not available, the controller 3 expands the storage area for storing the swap file to the storage area of the HDD 2 ("NO" in step S36; step S39). Accordingly, the controller 3 stores the swap file shifted from the host system 4 into the expanded area comprising the high-speed access area 10B and the storage area reserved in the HDD 2 (step S40). At this time, the controller 3 may reserve the file area for the swap file in the HDD 2 and may vary the reserved file area in accordance with the file size of the swap size which cannot be stored in the high-speed access area 10B.

Figure 6B:
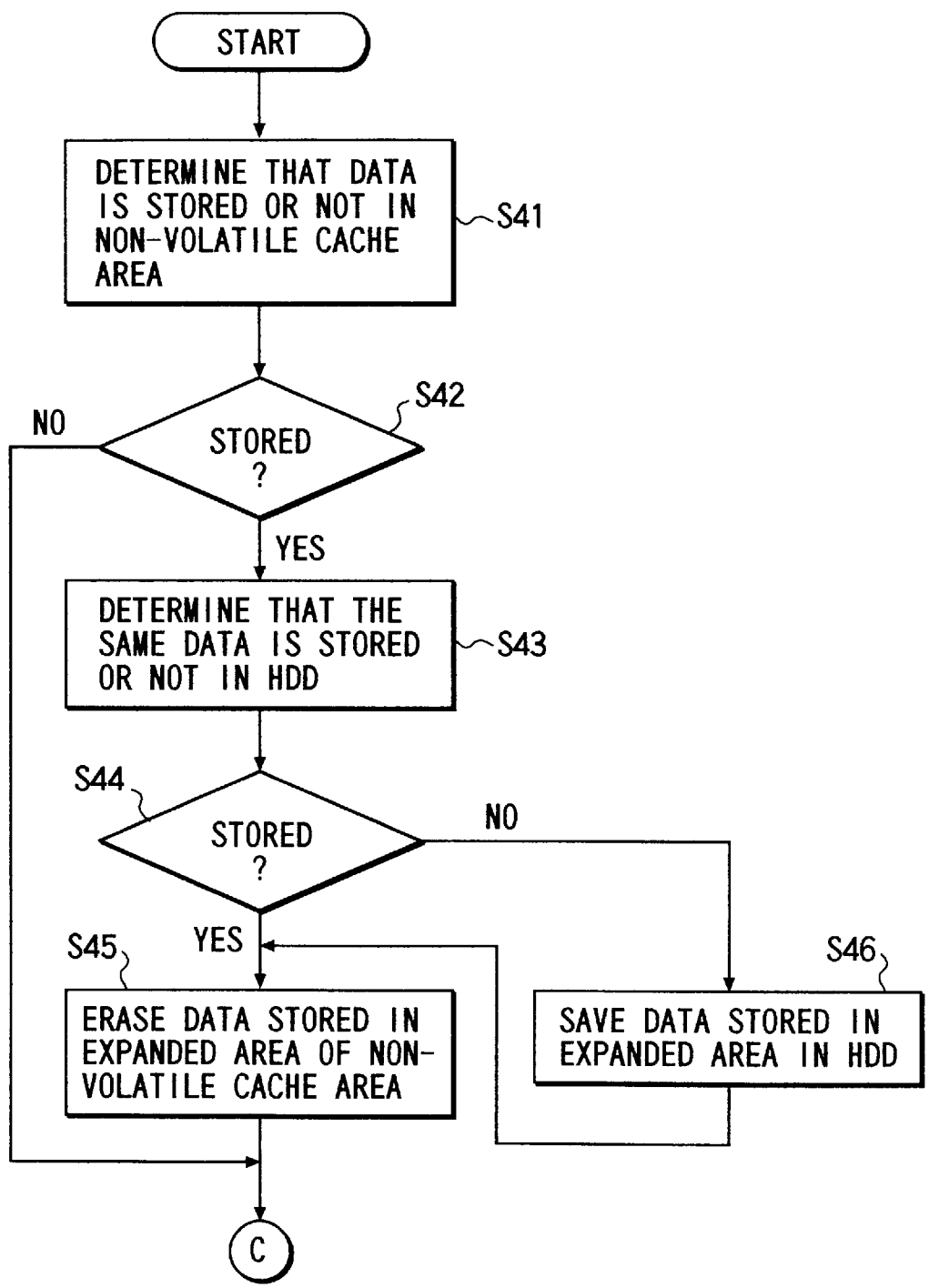

The controller 3 performs a process, as shown in FIG. 6B, to expand the storage area for storing the swap file to the non-volatile cache area 10C (see step S37).

The controller 3 determines whether data is stored in the non-volatile cache area 10C (steps S41 and S42). If no data is stored in the non-volatile cache area 10C, the controller 3 expands the storage area to the non-volatile cache area 10C, as described above, and stores the swap file in the expanded area comprising the high-speed access area 10B and non-volatile cache area 10C.

On the other hand, if data is stored in the non-volatile cache area 10C, the controller 3 determines whether or not the data is stored in the HDD 2 (step S43). If the data is stored in the HDD 2, the data stored in the area used as the expanded area of the non-volatile cache area 10C is erased ("YES" in step S44; step S45). Accordingly, the area in the non-volatile cache area 10C, from which the data has been deleted, can be used as expanded area. If the data is not stored in the HDD 2, the data stored in the area used as the expanded area of the non-volatile cache area 10C is saved in the HDD 2 (step S46). Then, the data is erased and the area in the non-volatile cache area 10C, from which the data has been erased, can be used as the expanded area.

As has been described above, according to the system of the present embodiment, the file information such as a swap file with a variable file size can be stored (shifted) by using the high-speed access area 10B of flash memory unit 1 which can be accessed by the OS or AP. Unlike the conventional method in which the swap file is shifted to the HDD 2, the high-speed access area 10B in flash memory unit 1 is used. Thus, the swap file can be accessed at high speed, where necessary. In other words, the swap file can be restored to the main memory 23 at high speed.

In addition, the storage area of the high-speed access area 10B can be substantially increased by using the HDD 2 cooperatively. Accordingly, even if the file size of the swap size is much greater than the high-speed access area 10B, the swap file can be stored (shifted) by using the large-capacity file area in the HDD 2.

(Third Embodiment)

Figure 7A:
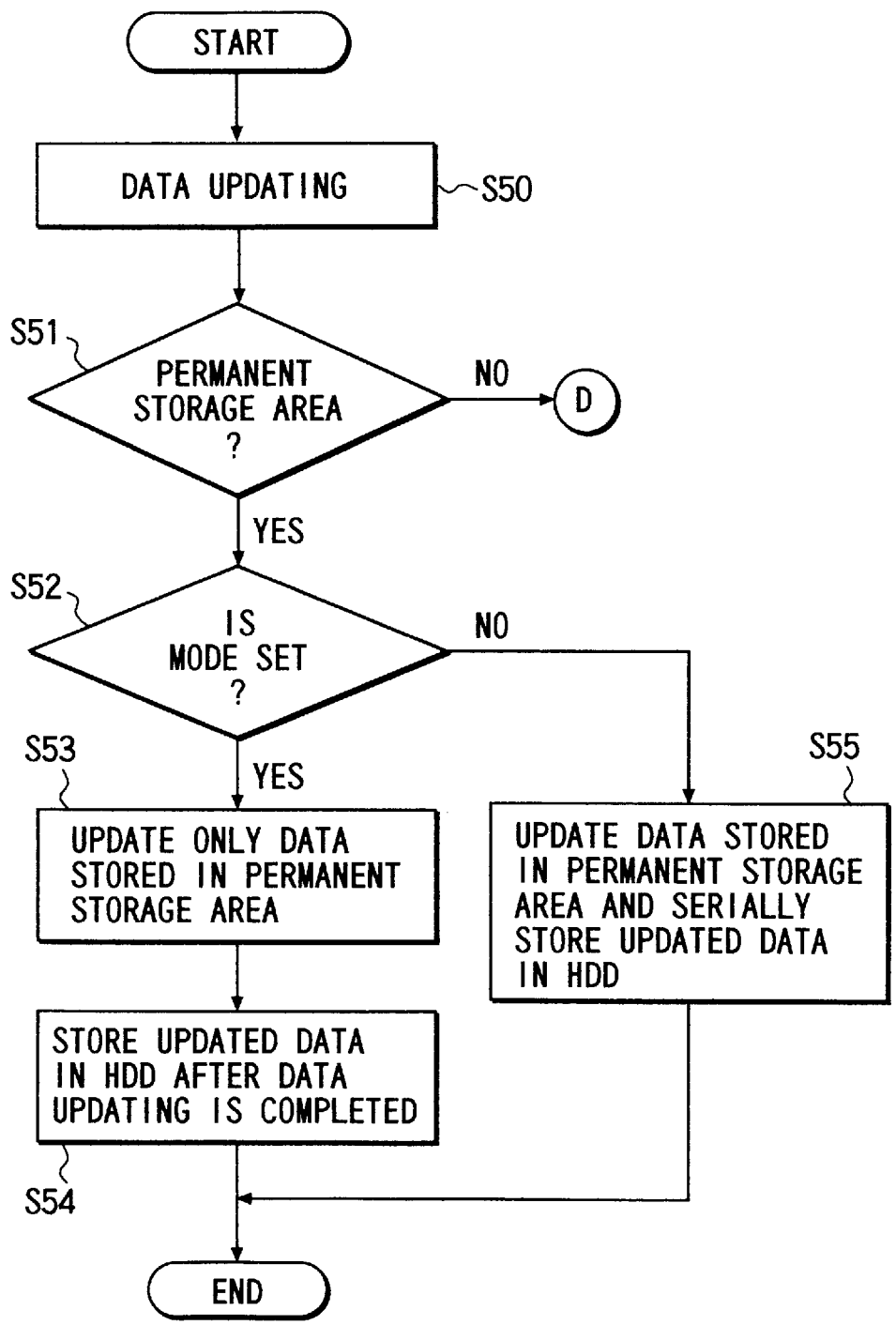
FIGS. 7A and 7B are flow charts illustrating a operation relating to a third embodiment of the invention.
Figure 7B:
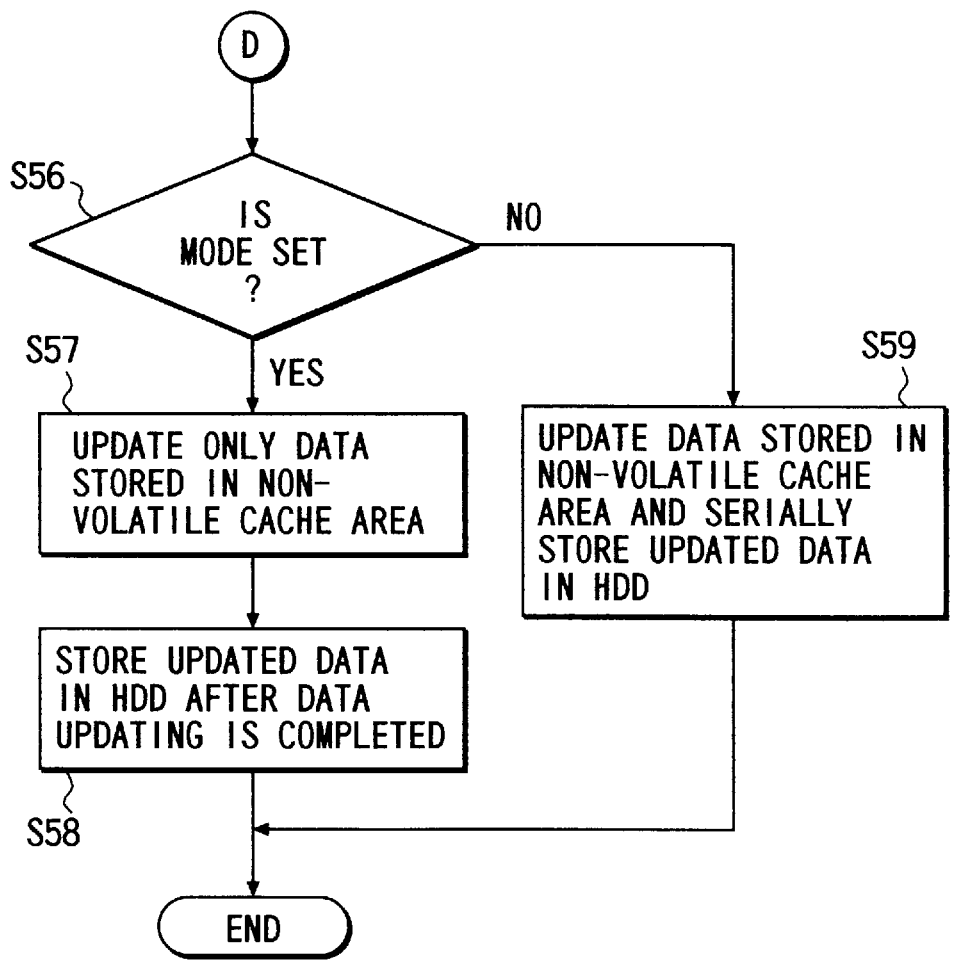

FIGS. 7A and 7B are flow charts relating to a third embodiment of the present invention. The third embodiment relates to a system using the permanent storage area 10A and non-volatile cache area 10C in the flash memory unit 1.

The permanent storage area 10A and non-volatile cache area 10C function as cache memory areas of the HDD 2. Normally, each time the data in the cache memory area is updated, the updated data is written in the HDD 2. In this embodiment, the user can set the mode of each of the areas 10A and 10C, thereby determining whether or not the updated data should be written in the HDD 2 each time the data is updated.

If data updating occurs in the flash memory unit 1, the controller 3 confirms the mode of each of the areas 10A and 10C set by the user (steps S50 and S51). If the mode of the permanent storage area 10A is set, the controller 3 prohibits writing of updated data in the HDD 2 until data updating in the permanent storage area 10A is completed. The controller 3 updates only the data stored in the permanent storage area 10A ("YES" in step S52; step S53). After the data updating is completed, the controller 3 writes the updated data in the HDD 2 (step S54). On the other hand, if the mode is not set, updated data is written in the HDD 2 each time the data updating occurs in the permanent storage area 10A, like the conventional art (step S55).

Similarly, if the mode of the non-volatile cache area 10C is set, the controller 3 prohibits writing of updated data in the HDD 2 until data updating in the non-volatile cache area 10C is completed. The controller 3 updates only the data stored in the non-volatile cache area 10C ("YES" in step S56; step S57). After the data updating is completed, the controller 3 writes the updated data in the HDD 2 (step S58). On the other hand, if the mode is not set, updated data is written in the HDD 2 each time the data updating occurs in the non-volatile cache area 10C, like the conventional art (step S59).

According to this system, the frequency of access to the HDD 2 can be decreased since updated. data is not written in the HDD 2 each time data updating occurs. Thus, the processing efficiency of the system can be increased. In addition, by setting the mode, the updated data in the permanent storage area 10A can be temporarily prohibited from being written in the HDD 2. For example, when the AP is started, the frequency of access to the HDD 2 can be greatly reduced. On the other hand, the data in the non-volatile cache area 10C is written in the HDD 2 each time data updating occurs. Thus, the updated data in the non-volatile cache area 10C can surely be saved in the HDD 2. When the storage area of the high-speed access area 10B is expanded to the non-volatile cache area 10C, as described above, the data stored in the non-volatile cache area 10C may be immediately discarded. Since there is no need to perform a data save operation for the HDD 2, the storage area of the high-speed access area 10B can be efficiently expanded.

(First Modification of the Third Embodiment)

A first modification of the third embodiment relates to a system wherein the non-volatile cache area 10C is provided in advance with a storage area for new data write. According to this system, updated data can be stored in the storage area for new data write, without accessing the HDD 2. Needless to say, updated data has been stored in all the storage area for new data write, the HDD 2 is accessed and the saving process is performed. In this case, after a certain amount of accumulated updated data is saved in the non-volatile cache area 10C, the HDD 2 is accessed. As a result, the frequency of access to the HDD 2 is reduced. Because of the reduced frequency of access to the HDD 2, the power can be saved and a silent environment can be achieved. Furthermore, the operation environment of the user can be improved by enabling the user to set the storage area for new data write.

(Second Modification of the Third Embodiment)

FIGS. 8A and 8B are flow charts relating to a second modification of the third embodiment. This modification relates to a system wherein when the HDD 2 is accessed by the host system 4, it is determined whether data is to be stored in the flash memory unit 1, on the basis of the number of sectors to be accessed ("sector count value SN"). The operation of this modification will now be described with reference to the flow charts of FIGS. 8A and 8B.

If the host system 4 has issued a read command to the HDD 2, as shown in FIG. 8A, the controller 3 refers to a sector count value (SN) or the number of sectors to be accessed (steps S60 and S61). The sector count value (SN) is the number of successive sectors which are to be successively accessed from a designated sector address.

The controller 3 calculates the frequency of use ("access frequency") of data stored in the sectors, the access of which has been requested by the host system 4. On the basis of the access frequency and the number of successive sectors, it is determined whether data is to be stored in the non-volatile cache area 10C in the flash memory unit 1 (step S62). Specifically, if the data to be accessed has high access frequency, the controller 3 stores the to-be-accessed data read out from the HDD 2 into the non-volatile cache area 10C ("YES" in step S63; step S64).

On the other hand, the data to be accessed is low access frequency, the controller 3 determines whether the sector count value (SN) is lower than a predetermined value (step S65). Even in the case where the access frequency is low, if the number of to-be-accessed sectors is relatively small, the controller 3 stores the to-be-accessed data read out from the HDD 2 into the non-volatile cache area 10C ("YES" in step S65; step S64). If the number of to-be-accessed sectors is relatively large, the controller 3 does not store the to-be-accessed data into the flash memory unit 1 ("NO" in step S65; step S66).

Now referring to FIG. 8B, a description will be given of the case where the permanent storage area 10A is used when data is stored in the flash memory unit 1. At first, if the host system 4 has issued a read command to the HDD 2, the controller 3 refers to the sector count value (SN) or the number of sectors to be accessed (steps S70 and S71). It is assumed that the sector count value (SN) can be set by the user.

The controller 3 determines whether the sector count value (SN) is smaller than a relatively small value set by the user. If the number of to-be-accessed sectors is smaller than the user' set value, the data is stored in the permanent storage area 10A (steps S72 and S73).

On the other hand, the controller 3 determines whether the sector count value (SN) is smaller than a relatively large value set by the user. If the number of to-be-accessed sectors is greater than the user's set value, the controller 3 does not store the to-be-accessed data in the flash memory unit 1 ("NO" in step S74; step S76). If the number of to-be-accessed sectors is less than the user's set value, the controller 3 stores the data in the permanent storage area 10A ("YES" in step S74; "YES" in step S75; step S73).

In the above system, it is determined whether the data to be accessed by the host system is to be stored in the flash memory unit 1 or not, on the basis of the number of sectors and the frequency of use (access frequency). For example, if the data is AP control information which is used at high frequency, the data is stored in the non-volatile cache area 10C, irrespective of the number of sectors. In addition, the sector count value (SN) can be set by the user, and only the to-be-accessed data having a small number of sectors can be stored in the flash memory unit 1. Accordingly, the storage areas in the flash memory can be properly sorted according to the condition of use of data. Therefore, no storage area in the flash memory is left useless, and the efficiency of use can be enhanced.

The sector count value (SN) for sorting the data may be varied according to the frequency of access by making use of the learning effect. For example, when data of a certain size is accessed, the data is not stored in the flash memory unit 1 if the frequency of access to the HDD 2 is one or two. If the data is accessed thrice, it is stored in the flash memory unit 1. Specifically, access data, which exceeds a threshold value determined by the access frequency and sector count value, is stored in the flash memory unit 1. Thus, random access data with high access frequency is stored in the flash memory unit 1, and the efficiency of the cache system can be enhanced.

As has been described above in detail, in the data storage system using the flash memory unit 1 and HDD 2, the non-volatile cache memory areas are divided and individually managed according to the condition of use, e.g. the frequency of use of data. Thereby, the efficiency of use of the system can be enhanced. In addition, the cooperative function with the HDD can be realized. In addition to normal cache memory functions, the swap file with variable file size can be stored in the variable file area. As a result, the data storage system having high access performance and large capacity can be achieved, and the performance of the computer system can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A data storage system that stores data in a storage medium and reads out data from the storage medium under control of a host system, the data storage system comprising:

a disk drive using a disk as the storage medium and storing in said disk data transferred from the host system;

flash memory means using a non-volatile flash memory as the data storage medium, and having an entire storage area logically sorted into a plurality of storage areas assigned to predetermined functions; and control means for controlling data input/output of said disk drive and said flash memory means.and storing all data or specified data stored in the disk of the disk drive into that one of the logically sorted storage areas in the flash memory means, which has the associated function.

2. The system according to claim 1, wherein said flash memory means has the entire storage area logically sorted into a first storage area for permanently storing data, a second storage area which can be associated with the host system and is used for high-speed access, and a third storage area for use as a non-volatile cache memory area.

3. The system according to claim 2, wherein said control means, upon receiving an instruction from the host system, stores specified data transferred from the host system into the disk of the disk drive, and permanently stores the specified data in said first storage area until an erase command is issued from the host system.

4. The system according to claim 2, wherein said control means, upon receiving an instruction from the host system, stores specified data transferred from the host system into said second storage area before the data is stored in the disk of the disk drive.

5. The system according to claim 2, wherein said control means has a cache memory function of:

storing specified data transferred from the host system into the disk of the disk drive;

reading out the specified data from the disk and storing the specified data in the third storage area; and reading out the specified data from the third storage area when a read command to read out the specified data is issued from the host system, and transferring the read-out data to the host system.

6. The system according to claim 4, wherein said control means includes means for determining whether or not said second storage area has an area size for storing the specified data transferred from the host system, and when the area size in the second storage area is determined to be insufficient by said determining means at the time of storing the specified data in accordance with an instruction from the host computer, the second storage area is expanded to a storage area in the disk of the disk drive and the specified data is stored dividedly into the second storage area and the expanded area in the disk.

7. A data storage system that stores data in a storage medium and reads out data from the storage medium under control of a host system, the data storage system comprising:

a disk drive using a disk as the storage medium and storing in said disk data transferred from the host system;

flash memory means using a non-volatile flash memory as the data storage medium, and having a designated storage area logically set in an entire storage area to be used for a predetermined function; and control means for controlling data input/output of said disk drive and said flash memory means and including means for enabling the flash memory means to function as cache memory means of the disk drive, wherein the control means, upon receiving an instruction from the host system, reads out specified data from the all data stored in the disk and stores the specified data in the designated storage area in the flash memory means.

8. The system according to claim 7, wherein the flash memory means has, as said designated storage area, a permanent storage area for permanently storing data, the control means, in accordance with an instruction from the host system, stores the specified data read out from the disk into the permanent storage area and permanently retains the specified data until an erase command is issued from the host system, and the control means, upon receiving a read quest from the host system, reads out the specified data from the permanent storage area and transfers the read-out specified data to the host system.

9. The system according to claim 8, wherein the control means permanently retains the specified data stored in the permanent storage area, until the erase command is issued from the host system or the specified data stored in the disk is updated.

10. The system according to claim 8, wherein the control means stores the specified data read out from the disk into the permanent storage area before an application program in the host system is started.

11. The system according to claim 7, wherein said control means has means for managing attribute information for referring to the specified data stored in the designated storage area.

12. The system according to claim 7, wherein the control means has a utility program which is prepared in advance and, by starting the utility program according to an instruction from the host system, initiates an operation of reading out the specified data from all data stored in the disk and storing the read-out data in the designated storage area, and halting the utility program according to a halt command from the host system.

13. The system according to claim 7, wherein the control means, after turning-on of power, stores mode information in the designated storage area, the mode information indicating the operation carried out to store the specified data in the designated storage area according to the instruction from the host system, and when the power is turned on again, the control means continues, on the basis of the mode information, to carry out the operation of reading out the specified data from the disk and storing the read-out data in the designated storage area until the mode information is erased.

14. The system according to claim 7, wherein said host system includes BIOS means having a predetermined program contained in software of the control means, and the BIOS means executes input/output control of the host system and, at the time of activating the host system, accesses the flash memory means as the cache memory means of the disk drive and reads out, from the designated storage area, control information necessary for activating the host system.

15. The system according to claim 7, wherein said flash memory means has the entire storage area logically sorted into a first storage area for permanently storing data, a second storage area which can be associated with the host system and is used for high-speed access, and a third storage area for use as a non-volatile cache memory area.

16. The system according to claim 15, wherein the control means, when accessing the flash memory means, manages individually the first storage area, the second storage area and the third storage area, and the control means stores in the first and third storage areas the data read out from the disk drive, and stores in the second storage area the data transferred from the host system.

17. The system according to claim 15, wherein the control means uses the second storage area of the flash memory means as a high-speed file storage area for storing a file transferred from the host system, and includes means for varying an area size of the second storage area in accordance with a file size of the file.

18. The system according to claim 17, wherein the control means includes means for expanding the area size of the second storage area to a storage area provided in the disk of the disk drive in accordance with the file size of the file.

19. The system according to claim 17, wherein the control means includes means for expanding the area size of the second storage area to a storage area provided in the third storage area in accordance with the file size of the file.

20. The system according to claim 7, wherein the control means includes means for selecting, in accordance with an instruction from the host system, one of a write mode in which updated data is written in the disk drive each time data stored in the designated storage area in the flash memory means is updated, and a write mode in which the updated data is written in the disk drive at a predetermined time.

21. The system according to claim 16, wherein the control means includes means for determining, when data stored in the first and third storage areas in the flash memory means has been updated, whether the updated data should be written in the disk drive each time the data updating occurs, in accordance with a mode set for each of the first and third storage areas.

22. The system according to claim 16, wherein a new data storage area is set in advance in the third storage area, said control means temporarily stores, when data stored in the third storage area has been updated, the updated data in the new data storage area, and the control means includes means for writing, when the amount of the updated data stored in the new data storage area has reached a predetermined value, all the updated data stored in the new data storage area into the disk drive.

23. The system according to claim 16, wherein the control means accesses, when a read command has been issued from the host system to the disk drive, the flash memory means and, if the data requested by the read command is not stored in the flash memory means, reads out the requested data from the disk drive and transfers the read-out data to the host system, and said control means includes means for determining whether the requested data read out from the disk drive should be stored or not in the flash memory means, in accordance with a predetermined condition.

24. The system according to claim 23, wherein the control means includes means for determining, when the requested data read out from the disk drive has been determined to be the data to be stored in the first storage area, whether the requested data should be stored in the first storage area in accordance with an instruction from the host system.

25. The system according to claim 23, wherein the control means determines whether the requested data read out from the disk drive should be stored or not in the flash memory means, on the basis of the frequency of access to the requested data.

26. The system according to claim 23, wherein the control means includes means for determining the priority of data on the basis of the frequency of access to data, when the data read out from the disk drive is stored in the flash memory means or when the data stored in the flash memory means is erased.

27. A method for controlling a storage medium that stores data from a host system in a data storage system having a disk drive and flash memory means, the method comprising the steps of:

reading out specified data from all data stored in the disk drive in accordance with an instruction from the host system;

determining whether the specified data is data to be used for a specific function; and storing, when said specified data is used for the specific function, the specified data in a designated storage area logically set, as a cache memory, in the flash memory means for use in performing the specific function.

28. A method for controlling a storage medium that stores data from a host system in a data storage system having a disk drive and flash memory means, the method comprising the steps of:

logically sorting, in accordance with an instruction from the host system, an entire storage area of flash memory means into a first storage area for permanently storing data, a second storage area which can be associated with the host system and is used for high-speed access, and a third storage area for use as a non-volatile cache memory area;

storing, in accordance with an instruction from the host system, specified data read out from the disk drive into one of the first storage area and the third storage area; and storing data transferred from the host system into the second storage area.

* * * * *